(12) United States Patent
Edsinger et al.

(10) Patent No.: US 9,205,560 B1
(45) Date of Patent: Dec. 8, 2015

(54) SYSTEM AND METHOD FOR FAILURE DETECTION OF A ROBOT ACTUATOR

(71) Applicant: Redwood Robotics, Inc., San Francisco, CA (US)

(72) Inventors: Aaron Edsinger, San Francisco, CA (US); Kevin Kemper, San Francisco, CA (US); Lee Magnusson, San Francisco, CA (US)

(73) Assignee: Redwood Robotics, Inc., San Francisco, CA (US)

( * ) Notice: Subject to any disclaimer, the term of this patent is extended or adjusted under 35 U.S.C. 154(b) by 6 days.

(21) Appl. No.: 14/309,981

(22) Filed: Jun. 20, 2014

Related U.S. Application Data (60) Provisional application No. 61/838,715, filed on Jun. 24, 2013.

(51) Int. Cl.
*B25J 9/16* (2006.01)

(52) U.S. Cl.
CPC .............. *B25J 9/1674* (2013.01); *Y10S 901/28* (2013.01); *Y10S 901/49* (2013.01)

(58) Field of Classification Search
CPC ..... B25J 9/1674; B25J 9/1653; Y10S 901/28; Y10S 901/49; Y10S 901/50
See application file for complete search history.

(56) References Cited

U.S. PATENT DOCUMENTS

| | | | | |
|---|---|---|---|---|
| 4,616,326 A | * | 10/1986 | Meier | B23K 9/1272 318/561 |
| 8,090,475 B2 | * | 1/2012 | Blanc | B25J 9/1674 700/261 |
| 8,548,628 B2 | * | 10/2013 | Kock | B25J 9/1612 700/177 |
| 8,649,904 B2 | * | 2/2014 | Sasai | B25J 9/1674 318/568.12 |
| 2013/0190926 A1 | * | 7/2013 | Motoyoshi | B25J 9/1653 700/254 |
| 2015/0057799 A1 | * | 2/2015 | Ueberle | G05B 23/0291 700/253 |

* cited by examiner

*Primary Examiner* — Nicholas Kiswanto
(74) *Attorney, Agent, or Firm* — McDonnell Boehnen Hulbert & Berghoff LLP (57) ABSTRACT

Systems and methods for detecting actuator component or sensor failure using non-equivalent sensors are described. An example method includes actuating a robot actuator, and determining a first result and second result of the actuation using a first sensor and second sensor respectively. Additionally, the method includes determining a first estimate of an internal state of the robot actuator using the first result, and determining a second estimate of the internal state using the second result and a normalization function that normalizes the second result for comparison with the first estimate. Further, the method includes determining whether a difference between the first estimate of the internal state and the second estimate of the internal state satisfies an error threshold. And the method includes providing an output indicative of a potential fault of the robot actuator in response to determining that the difference does not satisfy the error threshold.

23 Claims, 6 Drawing Sheets

SYSTEM AND METHOD FOR FAILURE DETECTION OF A ROBOT ACTUATOR

CROSS-REFERENCE TO RELATED APPLICATION

The present application claims priority to U.S. Patent Application Ser. No. 61/838,715, filed on Jun. 24, 2013, the entire contents of which are herein incorporated by reference.

BACKGROUND

Unless otherwise indicated herein, the materials described in this section are not prior art to the claims in this application and are not admitted to be prior art by inclusion in this section.

An actuator is a type of motor that is configured to move or control a mechanism or system. Typically, an actuator is controlled by an energy source, such as electric current, hydraulic fluid pressure, or pneumatic pressure, which the actuator in turn converts to motion. By way of example, an electric motor may convert electrical energy to mechanical torque. Similarly, a pneumatic actuator may convert energy formed by compressed air at high pressure into either linear or rotary motion, and a hydraulic piston may use hydraulic power to facilitate mechanical operation.

Some robotic devices use actuators to transform an electric signal into motion. If an actuator of a robotic device (robot actuator) experiences an electrical or mechanical failure, and this failure is not detected, the robot actuator may continue to operate, potentially causing injury to the robot or its environment. For this reason, robot actuators are often instrumented with a number of sensors, whose outputs may be used to evaluate the performance of the robot actuator. While some failure modes can be detected utilizing the sensors on the robot, this detection may not be robust, as a robot sensor itself may also fail. The use of redundant sensors can alleviate this issue; however, redundant sensors may add unwanted costs. Redundant sensors also tend to fail in the same way, so a redundant pair of sensors may fail at the same time.

SUMMARY

In one example, a method is provided. The method includes actuating a robot actuator using a computing device. The method also includes determining a first result of the actuation using a first sensor of the robot actuator, and determining a second result of the actuation using a second sensor of the robot actuator. Additionally, the method includes determining a first estimate of an internal state of the robot actuator using the first result of the actuation, and determining a second estimate of the internal state of the robot actuator using the second result of the actuation and a normalization function. The normalization function normalizes the second result of the actuation for comparison with the first estimate of the internal state of the robot actuator. Further, the method includes determining whether a difference between the first estimate of the internal state of the robot actuator and the second estimate of the internal state of the robot actuator satisfies an error threshold. And the method includes providing an output indicative of a potential fault of the robot actuator in response to determining that the difference does not satisfy the error threshold.

In another example, a computing device that includes one or more processors and a computer-readable medium is provided. The computer-readable medium is configured to store instructions, that when executed by the one or more processors, cause the computing device to perform functions. The functions include receiving a first result of an actuation of a robot actuator from a first sensor of the robot actuator, and receiving a second result of the actuation of the robot actuator from a second sensor of the robot actuator. The functions further include determining a first estimate of an internal state of the robot actuator using the first result of the actuation, and determining a second estimate of the internal state of the robot actuator using the second result of the actuation and a normalization function. The normalization function normalizes the second result of the actuation for comparison with the first estimate of the internal state of the robot actuator. The functions also include determining whether a difference between the first estimate of the internal state of the robot actuator and the second estimate of the internal state of the robot actuator satisfies an error threshold. And the functions include providing an output indicative of a potential failure of the robot actuator in response to determining that the difference does not satisfy the error threshold.

In still another example, a system including a robot actuator, at least two sensors configured to measure actuator activity of the robot actuator, and a computer-based controller is provided. The computer-based controller is configured to receive a first result of an actuation of the robot actuator from a first sensor of the at least two sensors, and receive a second result of the actuation of the robot actuator from a second sensor of the at least two sensors. The computer-based controller is further configured to determine a first estimate of an internal state of the robot actuator using the first result of the actuation, and determine a second estimate of the internal state of the robot actuator using the second result of the actuation and a normalization function. The normalization function normalizes the second result of the actuation for comparison with the first estimate of the internal state of the robot actuator. Additionally, the computer-based controller is configured to determine whether a difference between the first estimate of the internal state of the robot actuator and the second estimate of the internal state of the robot actuator satisfies an error threshold. And the computer-based controller is configured to provide an output indicative of a potential fault of the robot actuator in response to determining that the difference does not satisfy the error threshold.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples described herein include systems and methods for detecting actuator component failure and/or actuator sensor failure using two or more non-equivalent sensors. As described herein, the non-equivalent sensors may either be (a) sensors that measure actuator activity at different locations within the actuator, or (b) sensors that sense different modalities.

In one example system, a robot actuator is equipped with a sensor suite that can detect actuator component failure and also detect failure of sensors of the robot actuator. The robot actuator includes two or more non-equivalent sensors that are equipped to measure actuator activity of the robot actuator. The system further includes a computer-based controller that is configured to monitor results of the actuator activity, and detect a fault(s) in the actuator (e.g., actuator component failure(s) and/or actuator sensor failure(s)). By way of example, the computer-based controller may be configured to receive a first result of an actuation of the robot actuator and a second result of the actuation of the robot actuator from a first sensor of the robot actuator and a second sensor of the robot actuator respectively. The computer-based controller may then determine a first estimate of an internal state of the robot actuator using the first result of the actuation, and determine a second estimate of the internal state of the robot actuator using the second result of the actuation and normalization function. For instance, the normalization function may normalize the second result of the actuation for comparison with the first estimate of the internal state of the robot actuator.

Additionally, the computer-based controller may determine whether a difference between the first estimate of the internal state of the robot actuator and the second estimate of the internal state of the robot actuator satisfies an error threshold. For instance, if the first estimate and the second estimate are each estimates of a belt tension of a timing belt, the error threshold may be an amount of tension. In response to determine that the difference does not satisfy the error threshold, the computer-based controller may provide an output indicative of a potential fault of the robot actuator. For example, if the two estimates of belt tension differ by more than the error threshold, the computer-based controller may provide an output indicating a failure of the first sensor, the second sensor, or the timing belt.

Further, in some instances, the computer-based controller may provide the output and optionally a log of data from the first sensor and the second sensor to a remote server for diagnostics, analytics, and support. For example, the computer-based controller may provide the output and log of data to a remote server that is controlled by an actuator vendor, an actuator owner, or an actuator operator.

Various other examples of comparisons between internal states of the robot actuator are described herein. Although portions of this disclosure are described with respect to a torque controlled robot actuator, the examples are not meant to be limiting. The methods and systems described are applicable to other types of robot actuators that are equipped with a sensor suite that can detect actuator component failure and/or actuator sensor failure.

Figure 1:
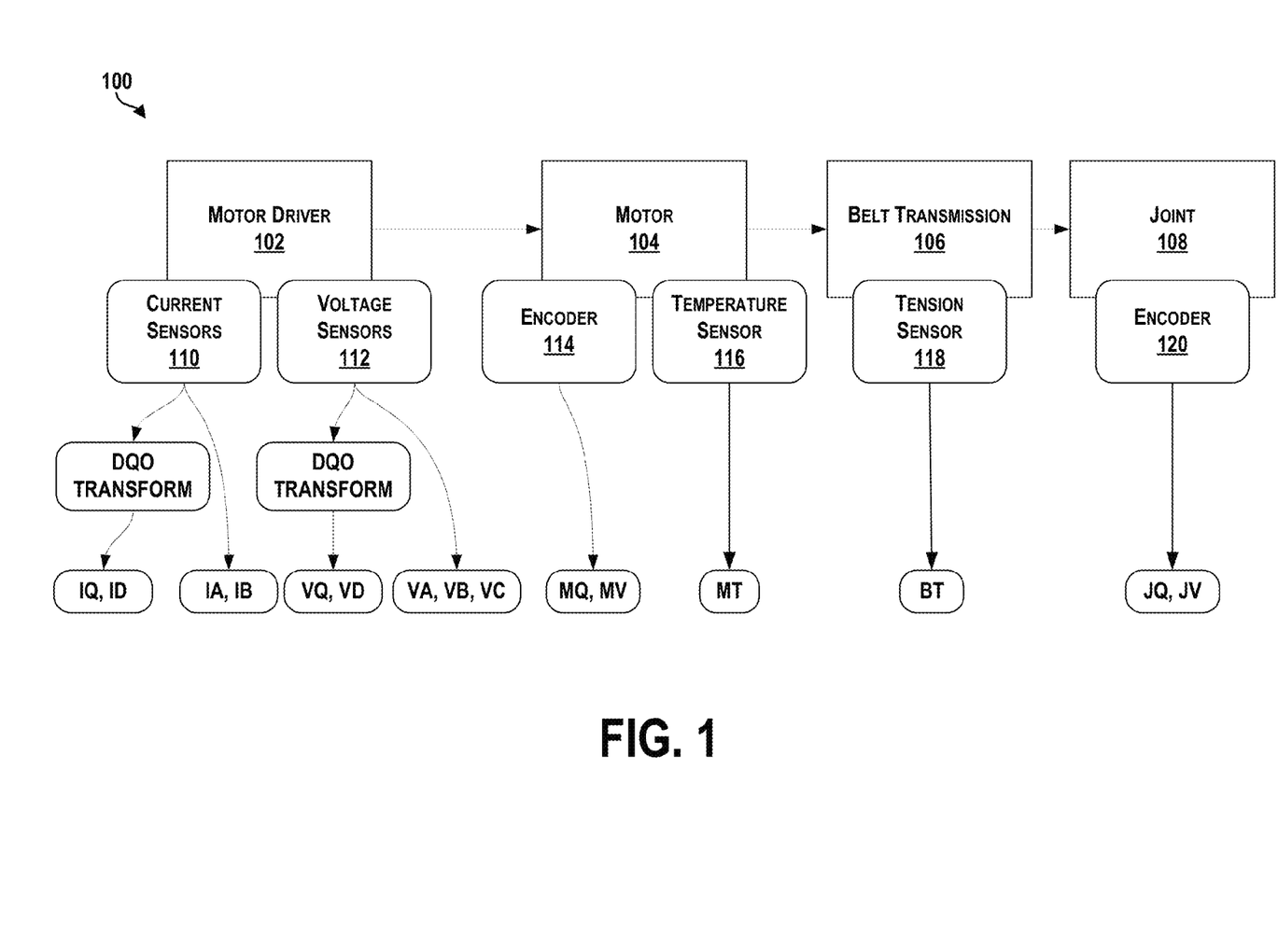
FIG. 1 illustrates a block diagram of an example actuator having a plurality of sensors.

Referring now to the figures, FIG. 1 illustrates a block diagram of an example actuator 100 having a plurality of sensors. As shown in FIG. 1, the example actuator 100 includes multiple components, namely, a motor driver 102, a motor 104, a belt transmission 106, and a joint 108. Each of the components of the actuator 100 in turn is instrumented with different sensors. As depicted, the motor driver 102 includes one or more current sensors 110, and one or more voltage sensors 112. The motor 104 includes an encoder 114 and a temperature sensor 116. The belt transmission 106 includes a tension sensor 118. And the joint 108 includes an encoder 120.

In one embodiment, the motor 104 may be an electric motor powered by a direct current (DC) source. For instance, the motor 104 may be a brushless DC (BLDC) motor and the motor driver 102 may be a BLDC motor driver. In such a configuration, the current sensors 110 may measure the current "IA" and "IB" on two (or more) respective legs of a three-phase bridge controlling the motor 104. For instance, the current sensors 110 may be Hall Effect sensors or shunt resistor current sensors. Additionally, a direct-quadrature-zero (DQO) transformation may be applied to "IA" and "IB" to determine "IQ" and "ID". "IQ" may be defined as the torque producing current, while "ID" may be defined in the null space. Further, the voltage sensors 112 on the motor driver 102 may measure three winding voltages "VA", "VB", and "VC". Additionally, "VQ" and "VD" may be determined using a DQO transformation.

The encoder 114, or alternatively another position sensor, on the motor 104 may measure the motor position "MQ" and a computed motor velocity "MV". By way of example, the encoder 114 may be an absolute or incremental rotary encoder, such as an absolute optical encoder.

The temperature sensor 116 may determine the motor temperature "MT" by measuring the temperature of the motor winding or housing. As an example, the temperature sensor 116 may be a thermistor.

The tension sensor 118 may measure a belt tension "BT" of a timing belt of the actuator 100. For instance, a tension idler on the timing belt may be instrumented with a strain gauge such that the strain gauge can measure the belt tension of the timing belt (as described in FIG. 2).

Finally, the encoder 120, or another position sensor, on the joint 108 may measure the joint position "JQ" and a computed joint velocity "JV". Similarly to the encoder 114, the encoder 120 may be an absolute or incremental rotary encoder, such as an absolute optical encoder.

The example actuator 100 is provided for purposes of example only. Other actuators may include more or less sensors than the plurality of sensors depicted in FIG. 1. Thus, the configuration illustrated in FIG. 1 is not meant to be limiting.

Figure 2:
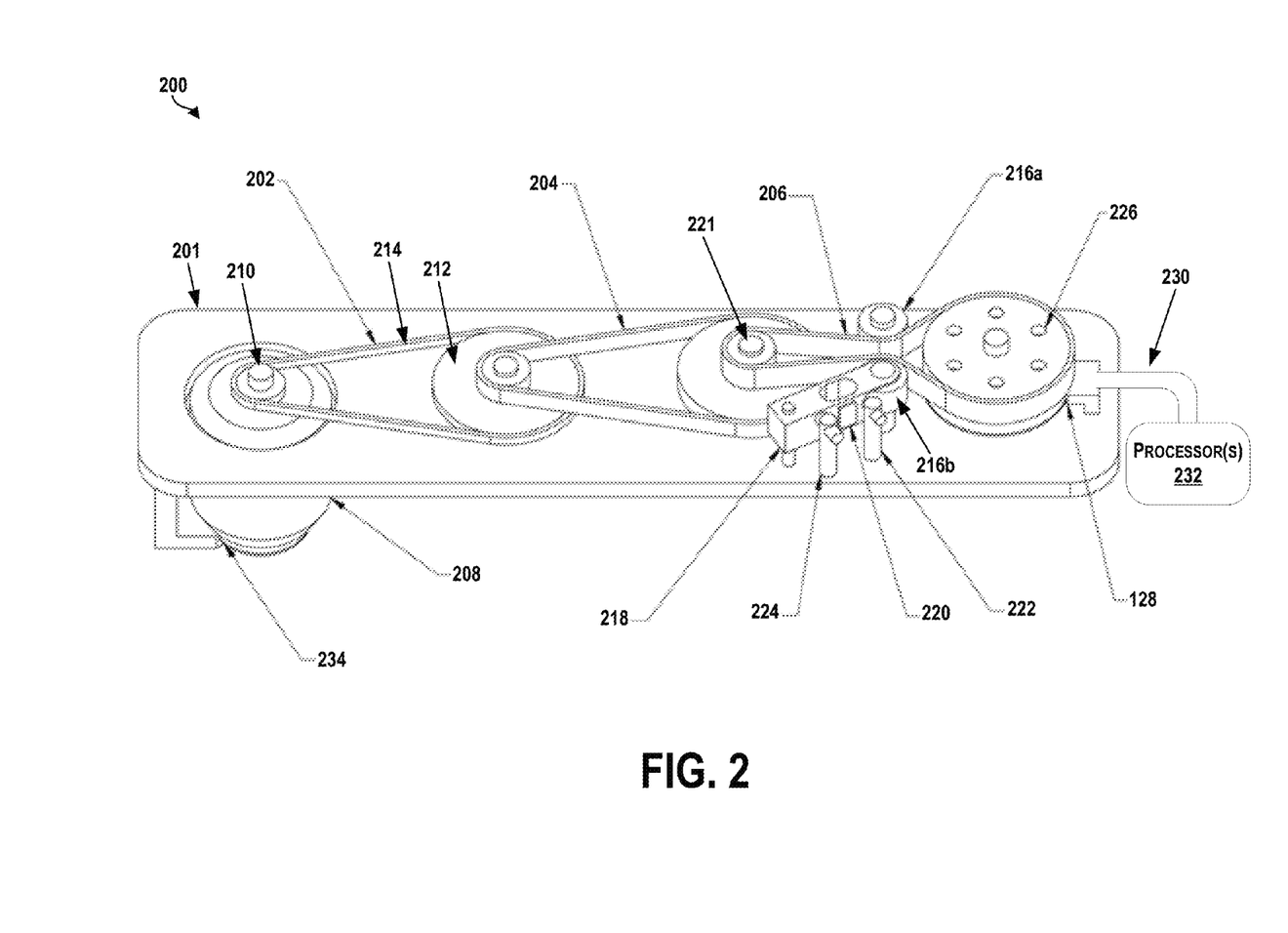
FIG. 2 illustrates an example torque controlled actuator.

Although FIG. 1 includes a single belt transmission, in other examples, a robot actuator may include multiple timing belt transmissions that drive a joint of a robotic link. FIG. 2 illustrates an example torque controlled actuator 200. The torque controlled actuator 200 comprises a frame 201, and one or more timing belt stages coupled in serial on the frame 201 for speed reduction. The torque controlled actuator 200 in FIG. 2 illustrates a first timing belt stage 202, coupled to a second timing belt stage 204, coupled to a third timing belt stage 206. The timing belt stages include an input stage (e.g., the first timing belt stage 202) for coupling to a motor 208, such as an electric motor, and an output stage (e.g., the third timing belt stage 206) for coupling to a load. The timing belt stages couple rotation of the motor 208 to rotation of an output of the third timing belt stage 206.

Within the torque controlled actuator 200, each of the timing belt stages 202, 204, and 206 includes a stage input 210, a hub 212, and a timing belt 214 wrapped around the stage input and the hub. The stage input 210 and the hub 212 may comprise pulleys mounted on rolling bearings, for example.

As shown in FIG. 2, the motor 208 is positioned on one side of the frame 201, and the timing belt stages 202, 204, and 206 are positioned on the other side of the frame 201. The motor 208 couples to the stage input 210 of the first timing belt stage 202 to cause rotation of the stage input 210, the timing belt 214, and the hub 212.

The torque controlled actuator 200 includes one or more belt idlers, such as belt idlers 216a-b, coupled to the frame, and the belt idlers 216a-b contact a timing belt of the third timing belt stage 206. The belt idlers 216a-b include an idler wheel that rolls against the timing belt of the third timing belt stage 206. Although in this example, a one-sided belt is used, other configurations may include use of a belt with a tooth profile on both sides. Further, the belt idlers 216a-b are shown contacting a back side of a one-sided belt, and other example configurations may include idlers which contact the belt on a toothed side. In addition, although shown on the third timing belt stage 206, or an output stage, the belt idlers 216a-b may be provided on multiple stages or all stages of the torque controlled actuator 200 within some examples. The belt idlers 216a-b that contact the timing belt stage may be used to apply adjustable tension to the timing belts, and may include a mechanism, such as a dial or wheel, to apply adjustable tension to the timing belts. The belt idlers 216a-b allow for adjustment of overall transmission preload, and therefore, stiffness of the timing belts.

The torque controlled actuator 200 also includes a load cell 218 coupled to the belt idler 216b, and the load cell 218 is arranged as a bending beam. Although one load cell 218 is shown, the torque controlled actuator 200 may include more load cells. A strain gauge 220 is provided on the load cell 218 to determine a tension of the timing belt of the third timing belt stage 206 based on force applied by the timing belt of the third timing belt stage 206 to the belt idler 216b. Deflection of the load cell 218 is determined by the strain gauge 220, for example. Although one strain gauge is illustrated, the load cell 218 may include multiple strain gauges, such as one on each surface of the load cell 218 and oriented in different manners. The strain gauge 220 may be a capacitive load cell, a Hall Effect load cell, or other device to measure load applied, for example.

The torque controlled actuator 200 also includes a hardstop 222 coupled to the frame 201 for limiting an amount of deflection of the load cell 218. For example, the hardstop 222 may be a mechanical hardstop employed to limit overall deflection of the load cell 218 during an overload condition to provide overload protection. The hardstop 222 restricts a range of motion and protects the load cell 218 from elastic deformation. As shown, the hardstop 222 may include a post with a setscrew for hardstop adjustment. A load cell tensioner 224 may also be included to apply adjustable tension to the timing belt.

The third timing belt stage 206 drives an output hub 226 to which an actuator load is attached. Output torque is measured by sensing tension in the timing belt of the third timing belt stage 206. As described, the belt tension is measured by the load cell 218 that instruments the one or more belt idlers 216a-b. An angular position of the output hub 226 can be measured using an encoder 228 or similar sensor that is coupled to the frame 201.

The third timing belt stage 206 is shown to include the belt idlers 216a-b and load cell 218. In other examples, each stage of the torque controlled actuator 200 includes belt idlers and load cells to determine a torque at each stage.

The torque controlled actuator 200 also includes or couples to a control bus 230 and one or more processors 232, and the strain gauge 220 outputs the tension of the timing belt of the third timing belt stage 206 to the control bus 230. The processor(s) 232 are coupled to the control bus 230 for determining output torque of the torque controlled actuator based on the tension of the timing belt of the third timing belt stage 206 stage.

The torque controlled actuator 200 also include a motor encoder 234 (or other angular displacement sensor) coupled to or attached to the motor 208 to determine or sense an angular position of the motor 208. A motor amplifier (not shown in FIG. 2) may also be included that determines a motor current based on the tension of the timing belt of the third timing belt stage 206. In one example, the motor amplifier determines the motor current based on a servo control loop to control the motor current applied to the motor 208 to achieve a desired output torque (described more fully below).

Within the example torque controlled actuator 200, three timing belt stages are illustrated; however, the design may be implemented as an N-stage system including 1-N timing belt stages. Each timing belt stage provides a reduction of motor input speed while it increases torque output. An example single timing belt stage may provide a reduction or about 2:1 to about 6:1, or other reductions are possible as well including a 1:1 power transfer stage that can also be used to sense force for instance. Thus, three timing belt stages coupled serially may provide a reduction of motor input of about 35:1 to about 40:1. This enables a low gear ratio that may offer increased performance with the timing belts. Using a low gear ratio lowers the inertia of the actuator or modular link enabling safe operation of the torque controlled actuator 200 next to a human operator, for example. This may also provide better passive control characteristics and better fourth control bandwidth, for example.

The example torque controlled actuator 200 thus includes a motor driven belt system to an output joint that uses one or more idlers to measure belt tension, from which torque of the joint can be deduced (i.e., to convert units of strain from output of strain gauge to units of torque). The belt idlers 216a-b put tension on the timing belt and the strain gauge 220 can measure belt tension for determination of output torque. The load cell 218 is fixed to the frame 201 and is not moving with the output, and thus, no load cell cables are required for rotation of the output hub.

Timing belts of the torque controlled actuator 200 exhibit zero backlash, which enables precise applications. The timing belts also exhibit transmission compliance, which makes the joint non-stiff and therefore safer for human contact. Sensing of both the motor position, using the motor encoder 234, and the joint position, using the output encoder 228, allows for precise control of an output angle even though the torque controlled actuator 200 exhibits elasticity. Similarly, sensing of belt tension of the output stage enables direct measurement and control of the joint torque, and cancellation of transmission friction by closing a servo control loop around a force sensor (e.g., strain gauge 220).

In other examples, output torques can be determined without strain gauges. For example, output torque can be estimated based on current applied to achieve a torque. Currents can be applied to determine known output torques over time, and a magnitude of the current can be associated with an output torque.

Within examples, overall efficiency of the torque controlled actuator 200 may be approximately $0.95^N$, where N is a number of timing belt stages. For an example three stage system, this may result in about an 85% efficient transmission that enables a lower torque motor compared to those used in a harmonic drive transmission.

The torque controlled actuator 200 in FIG. 2 is illustrated with the belt idlers 216a-b. Other forms of belt tensioning are possible as well. Further, the torque controlled actuator described in FIG. 2 may be used in many implementations. One example implementation includes a two degree of freedom (DOF) modular robot link or actuator system. For instance, a two DOF actuator system may be arranged in multiple links to form a robot manipulator. The links may also be arranged to form other robotic systems, such as hexapod walkers and bipedal robots. Other example implementations are also possible.

Figure 3:
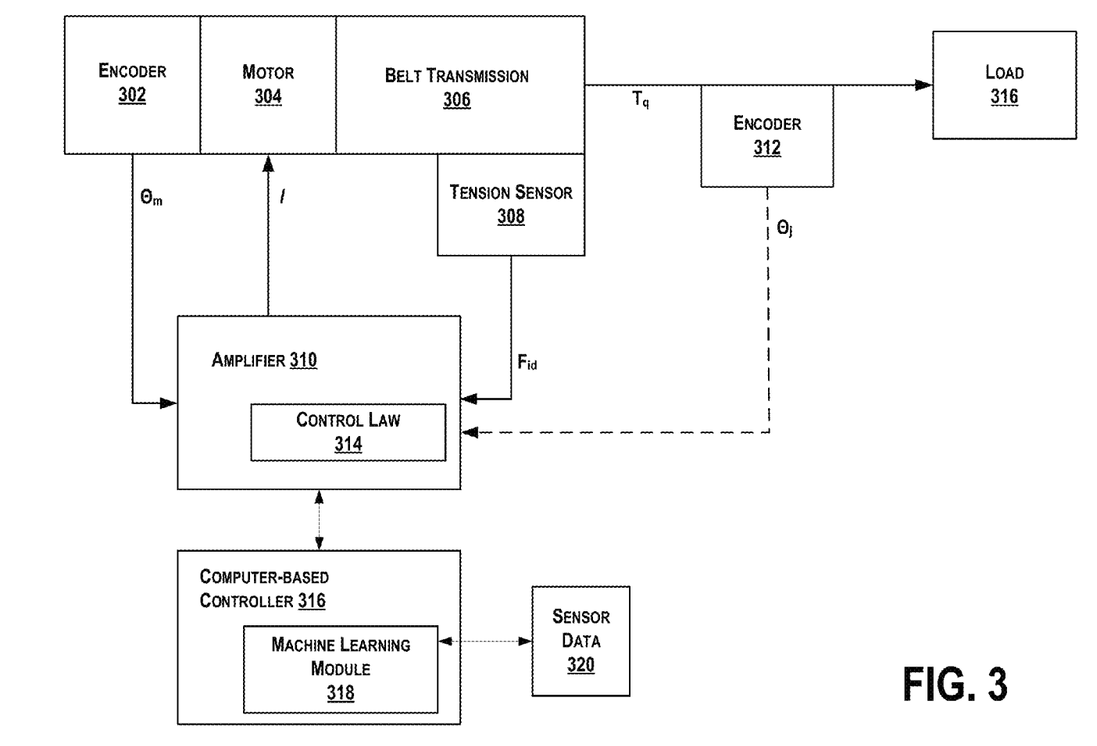
FIG. 3 is a block diagram illustrating an example system for control of a torque controlled actuator.

The torque controlled actuator 200 in FIG. 2, may be operated and controlled by a motor, motor amplifier, and control law. FIG. 3 is a block diagram illustrating an example system for control of a torque controlled actuator. As shown in FIG. 3, an encoder 302 may couple to a motor 304 that drives a belt transmission 306 of a single stage. A tension sensor 308 determines a belt tension sensor measurement, $F_{id}$, and outputs the belt tension sensor measurement to an amplifier 310. Another encoder 312 may couple to an output hub of the belt transmission 306 to sense a joint angle, $\Theta_j$, or load position. The encoders 302 and 312 may be optical encoders, Hall Effect sensors, or other capacitive angle sensors, for example. The torque controlled actuator is controlled by the motor amplifier 310 that receives as inputs $\Theta_m$, the motor angle, the belt tension sensor measurement, $F_{id}$, and optionally $\Theta_j$, the joint angle, and outputs a commanded motor winding current, I, as a function of these inputs according to a control law module 314. The motor winding current, I, causes the motor 304 to drive the belt transmission 306 for an output torque, $T_q$, which is applied to a load 316.

The control law module 314 may transform state variables into command current to the motor 304. A full state control or measure of a full state of the system (e.g., motor position with encoder, motor velocity, motor acceleration, joint position with encoder, output torque with load cells) can be utilized as a linear combination to calculate the command current. A servo-loop is created around tension sensor values for torque applied at a joint. The control law module 314 may operate as a known proportional integral derivative (PID) module, for example. A PID controller may include a control loop feedback mechanism that calculates an error value as a difference between a measured process variable and a desired set point. The PID controller attempts to minimize the error by adjusting process control outputs. The PID controller algorithm may involve three separate constant parameters, including the proportional, the integral, and the derivative values, denoted P, I, and D. These values can be interpreted in terms of time: P depends on the present error, I on accumulation of past errors, and D is a prediction of future errors, based on current rate of change. A weighted sum of these three actions is used to adjust a process via a control element such as the output torque to be applied.

In one example, if less torque is desired, the amplifier 310 may lower the motor current to cause the motor 304 to drive the belt transmission 306 less strongly. For higher torque, the motor current may be increased. The motor current can be controlled as a continuous function of the sensed belt tension. Methods to achieve this include full state linear feedback with a dynamic model of the robotic and PID servo control. Additional control can be applied to accurately track a commanded joint position, torque, velocity, and/or impedance, for example.

The control law module 314, or other components of the design in FIG. 3, may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The control law module 314 may also be a computing device (or components of a computing device such as one or more processors), that may execute instructions to perform functions as described herein, such as actuating a robot actuator.

Within examples, operation of the torque controlled actuator can be modified for certain applications. For instance, if torque controlled actuator is in motion (e.g., is part of a moving link), then inertial effects of an idler may be coupled to a load cell if a mass of the idler is high. This interaction may be cancelled out in software by computing acceleration of the actuator using accelerometers or a kinematic model, inertial forces of the idler acting on the load cell, and a revised load value ($F_{id}'$) that subtracts away the inertial effect.

Within other examples, the tension sensing may exhibit hysteresis effects due to rubber of the timing belt being in a load path between a rigid tensile core of the belt and the strain gauge. This hysteresis can limit overall accuracy of the sensor which may be important for some applications. A hysteresis model can be employed to improve sensor accuracy. Standard modeling techniques, such as a Preisach Operator, can be employed to continuously compute the hysteresis value online and calculate a revised load value, $F_{id}'$, which cancels out the hysteresis.

Further, within other examples, the belt transmission may be compliant and stretch under load, causing a displacement in output position from an expected position. Use of an output encoder enables measurement of the actual output position independent of the load. A model of belt stretch may be employed in addition to, or instead of, the joint encoder. The belt stretch model can take as an input the applied tension in the belt, physical parameters of the belt such as modulus of elasticity, and environmental parameters such as temperature of the belt. The belt stretch model may output an amount of elastic stretch in the belt such that commanded motor position can be adjusted and a desired output position achieved. The model may be as simple as a linear spring, or may include non-linear effects such as hysteresis. Alternatively, the belt stretch can be measured empirically across a range of working loads and a look-up table used to compute the motor position offset.

The example system of FIG. 3 also includes a computer-based controller 316 that may execute instructions to perform the functions described herein. For example, the computer-based controller 316 may execute instructions to receive sensor values, determine estimates of an internal state of the torque controller actuator, and compare the estimates to detect actuator component failures and/or actuator sensor failures (as further described in later figures).

Additionally, in some examples, the computer-based controller 316 may automatically identify relationships between sensors using a machine learning module 318. Multiple sensors of the torque controlled actuator may generate streams of sensor data 320. Many of the sensor values may be linearly dependent. After monitoring a dataset of the sensor data 320, the machine learning module 318 may identify that two sensor values are related. For example, the machine learning module 318 may identify that motor temperature, MT, and motor velocity, MV, are related. The machine learning module 318 may then derive a calibration scalar(s) for a normalization function that normalizes the motor velocity for comparison with the motor temperature. In some examples, the machine learning module 318 may also determine a probabilistic distribution of expected values of MT and MV, which may be used to automatically identify outliers in sensor values.

Figure 4:
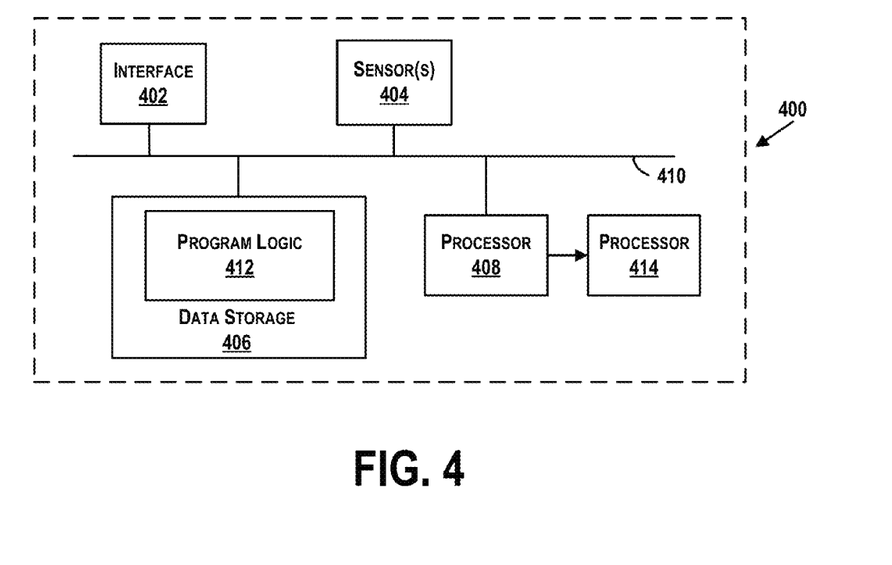
FIG. 4 illustrates a schematic drawing of an example computing device.

The control law module 314 and/or the computer-based controller 316 may take the form of a computing device, such as illustrated in FIG. 4. FIG. 4 illustrates a schematic drawing of an example computing device 400. In some examples, some components illustrated in FIG. 4 may be distributed across multiple computing devices. However, for the sake of example, the components are shown and described as part of one example device 400. The device 400 may be or include a mobile device, desktop computer, tablet computer, or similar device that may be configured to perform the functions described herein.

The device 400 may include an interface 402, sensor(s) 404, data storage 406, and a processor 408. Components illustrated in FIG. 4 may be linked together by a communication link 410. The communication link 410 is illustrated as a wired connection; however, wireless connections may also be used. The device 400 may also include hardware to enable communication within the device 400 and between the device 400 and another computing device (not shown), such as a server entity. The hardware may include transmitters, receivers, and antennas, for example.

The interface 402 may be configured to allow the device 400 to communicate with another computing device (not shown), such as a server. Thus, the interface 402 may be configured to receive input data from one or more computing devices, and may also be configured to send output data to the one or more computing devices. The interface 402 may also be configured to receive input from and provide output to a torque controlled actuator or modular link of a robot arm, for example. The interface 402 may include a receiver and transmitter to receive and send data. In other examples, the interface 402 may also include a user-interface, such as a keyboard, microphone, touchscreen, etc., to receive inputs as well.

The sensor 404 may include one or more sensors, or may represent one or more sensors included within the device 400. Example sensors include an accelerometer, gyroscope, pedometer, light sensors, microphone, camera, or other location and/or context-aware sensors that may collect data of the arm (e.g., motion of arm) and provide the data to the data storage 406 or processor 408.

The processor 408 may be configured to receive data from the interface 402, sensor 404, and data storage 406. The data storage 406 may store program logic 412 that can be accessed and executed by the processor 408 to perform functions executable to determine instructions for operation of the robot arm. Example functions include determination of estimates of an internal state of the robot actuator, and comparison of the estimates to detect potential faults of components of the robot actuator or sensors of the robot actuator. Any functions described herein, or other example functions for the robot actuator or system, may be performed by the device 400 or processor 408 of the device via execution of instructions stored on data storage.

The device 400 is illustrated to include an additional processor 414. The processor 414 may be configured to control other aspects of the device 400 including displays or outputs of the device 400 (e.g., the processor 414 may be a GPU). Example methods described herein may be performed individually by components of the device 400, or in combination by one or all of the components of the device 400. In one instance, portions of the device 400 may process data and provide an output internally in the device 400 to the processor 414, for example. In other instances, portions of the device 400 may process data and provide outputs externally to other computing devices.

Within some examples herein, operations may be described as methods for performing functions, and methods may be embodied on a computer program product (e.g., a tangible computer readable storage medium or non-transitory computer readable medium) that includes instructions executable to perform the functions.

Figure 5:
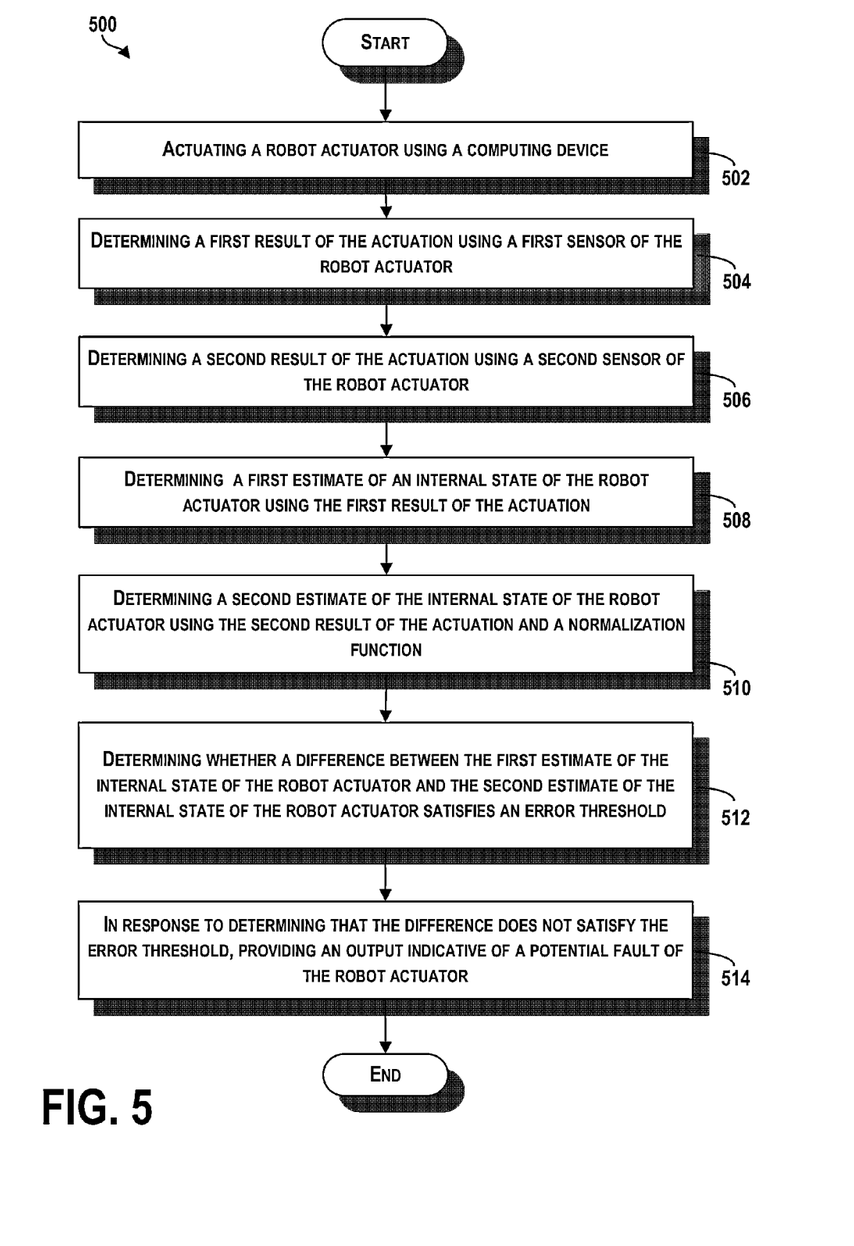
FIG. 5 is a block diagram illustrating an example failure detection method.

FIG. 5 is a block diagram illustrating an example failure detection method. Method 500 shown in FIG. 5 presents an embodiment of a method that could be used or implemented by the computer-based controller 316 of FIG. 3 or the computing device 400 of FIG. 4, for example, or more generally by one or more components of any computing device(s). Method 500 may include one or more operations, functions, or actions as illustrated by one or more of blocks 502-514. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 502, the method 500 involves actuating a robot actuator using a computing device. By way of example, the computing device may cause a motor amplifier to output a motor winding current, causing an actuation of the robot actuator. In one instance, the robot actuator may be a torque controlled actuator having one or more timing belt stages coupled in serial on the frame, as described above. In other instances, the robot actuator may take other forms.

At block 504, the method 500 involves determining a first result of the actuation using a first sensor of the robot actuator. And at block 506, the method 500 involves determining a second result of the actuation using a second sensor of the robot actuator.

In one embodiment, determining the first result of the actuation using the first sensor of the robot actuator involves measuring actuator activity of a first component of the robot actuator, and determining the second result of the actuation using the second sensor of the robot actuator involves measuring actuator activity of a second component of the robot actuator. As one example, the first sensor may measure a belt tension of a timing belt, and the second sensor may measure a motor position of a motor. As another example, the first sensor may measure a joint position of an actuated joint and the second sensor may measure a motor position of a motor. Additional examples are described below.

In another embodiment, the first sensor of the robot actuator may be configured to sense a first modality, while the second sensor of the robot actuator may be configured to sense a second modality that is different from the first modality. For instance, the first sensor may sense an angular position of a motor or joint, and the second sensor may sense a tension. Other possible modalities include, for example, velocity, voltage, current, and temperature.

At block 508, the method 500 involves determining a first estimate of an internal state of the robot actuator using the first result of the actuation. As one example, a belt tension may be estimated based on a tension measurement determined using a strain gauge. As another example, an output joint position may be determined based on an angular position measurement. As still another example, an output torque may be determined by multiplying a tension measurement by a predetermined scalar. Other examples are also possible.

At block 510, the method 500 involves determining a second estimate of the internal state of the robot actuator using the second result of the actuation and a normalization function. The normalization function may normalize the second result of the actuation for comparison with the first estimate of the internal state. In one instance, the internal state may be a belt tension, and a second estimate of the belt tension may be determined using a motor position and a joint position. In another instance, the internal state may be a joint position, and a second estimate of the joint position may be estimated using a motor position and a gear transmission ratio. In still another instance, the internal state may be an output torque, and a second estimate of the output torque may be estimated using a winding current, a motor torque constant, and a motor dynamics torque.

At block 512, the method 500 involves determining whether a difference between the first estimate of the internal state of the robot actuator and the second estimate of the internal state of the robot actuator satisfies an error threshold. In practice, the computing device may determine whether the difference between the first estimate and the second estimate satisfies a predetermined error threshold corresponding to the internal state. For instance, if the internal state is a belt tension, the error threshold may be a predetermined amount of tension. As another example, if the internal state is an output position, the error threshold may be a predetermined amount of angular rotation.

Further, determining whether the difference between the first estimate and the second estimate satisfies an error threshold may therefore involve determining whether the difference is greater than an error threshold, determining whether the difference is less than an error threshold, and/or determining whether the difference falls within an acceptable range of differences, depending on the type of internal state and the type of error threshold.

Depending on whether the first estimate of the internal state and the second estimate of the internal state satisfy the error threshold, the computing device may be configured to perform particular functions. For instance, at block 514, the method 500 involves providing an output indicative of a potential fault of the robot actuator in response to determining that the difference does not satisfy the error threshold. The output may be indicative of a potential fault of the first sensor or the second sensor. Additionally or alternatively, the output may be indicative of a potential fault of a component of the robot actuator, such as a timing belt or a motor.

As a particular example of the method 500, the computing device may receive, as a first result of the actuation, a belt tension, and receive a motor position and joint position as the second result of the actuation. The belt tension may be a first estimate of the belt tension of a timing belt. From the motor position and joint position, the computing device may determine a second estimate of the belt tension using a normalization function. Specifically, the normalization function may output a second estimate of the belt tension by computing a belt stretch, "BS", from the motor position, "MQ", and joint position, "JQ", and multiplying the belt stretch by a stiffness constant, "K". If the first estimate and the second estimate differ by more than an error threshold, the computing device may provide an output indicative of a faulty sensor or timing belt.

As another example of the method 500, the computing device may receive, as a first result of the actuation, a joint position, and receive a motor position as the second result of the actuation. The joint position may be a first estimate of an output position of the robot actuator. From the motor position, the computing device may determine a second estimate of the output position using a normalization function. Specifically, the normalization function may multiply the joint position by a transmission gear ratio and output the second estimate of the output position. If the first estimate and the second estimate differ by more than an error threshold, the computing device may provide an output indicative of a broken timing belt.

As still another example of the method 500, the computing device may receive, as a first result of the actuation, a belt tension. By multiplying the belt tension by a scalar, the computing device may determine a first estimate of an output torque. The computing device may also receive a winding current, "IQ" as the second result of the actuation, and determine a second estimate of the output torque using a normalization function. In particular, the normalization function may multiply the winding current, "IQ", by a motor torque constant, "Km", and add a motor dynamics torque, "Dyn", to the result. In one instance, the motor dynamics torque may be derived from a motor position and motor velocity. If the first estimate and the second estimate of the output torque differ by more than an error threshold, the computing device may provide an output indicative of a faulty sensor or faulty transmission.

As still another example of the method 500, the computing device may receive, as a first result of the actuation, a motor temperature, and determine an estimate of a winding temperature by transforming the motor temperature into winding space. The computing device may also receive winding currents "IQ" and "ID" and a motor velocity "MV" as a second result of the actuation. Using a normalization function, the computing device may determine a second estimate of the winding temperature. For instance, the normalization function may take "IQ", "ID", and "MV" as input, and output an estimate of the winding temperature. If the first estimate and the second estimate of the winding temperature differ by more than an error threshold, the computing device may provide an output indicative of a faulty sensor.

As still another example of the method 500, the computing device may receive, as a first result of the actuation, a winding voltage "VA", and receive a motor velocity "MV" and applied current "IQ" as the second result of the actuation. The winding voltage "VA" may be a first estimate of the winding voltage. A second estimate of the winding voltage may be determined using a normalization function that determines winding voltage using the applied current "IQ", a resistance "R", and the motor velocity "MV". If the first estimate and the second estimate of the winding voltage differ by more than a threshold amount, the computing device may provide an output indicative of a winding short.

As still another example of the method 500, the computing device may receive, as a first result of the actuation, a winding current "IQ", and receive a belt tension "BT" as a second result of the actuation. The winding current "IQ" may be a first estimate of the winding current. A second estimate of the winding current may be determined using a normalization function that estimates the winding current as a function of motor torque constant "Km", motor dynamics torque "Dyn", and belt tension "BT". If the first estimate and the second estimate of the winding current different by more than an error threshold, the computing device may provide an output indicative of a faulty sensor.

As still another example of the method 500, the computing device may receive, as a first result of the actuation, the motor position "MQ". The computing device may also receive the joint position "JQ" as a second result of the actuation. The relationship between MQ and JQ can be normalized according to the transmission gear ratio "GR" and the elongation of the belt under load (belt tension "BT" multiplied by scalar "K"), such that JQ=MQ*GR+BT*K. The actuator may be calibrated at start-up such that this relationship holds true. During operation, if the timing belt should skip a tooth, then the computing device may detect a fixed change in the phase relationship between MQ and JQ. For instance, the computing device may determine that −e<JQ−MQ*GR−BT*K<e, where "e" is related to a pitch constant of the belt.

In another example of the method 500, the computing device may receive, as a first result of the actuation, a motor winding temperature "MT", and receive a torque producing current "IQ" as the second result of the actuation. An estimate of the motor winding temperature may then be estimated using a thermal model, given IQ as an input to the thermal model. Therefore, if the computing device determines that MT deviates from the estimated temperature by more than a threshold, the computing device may provide an output indicative of an inefficient commutation of a brushless motor. This in turn may indicate that the motor encoder wheel phase has changed (e.g., slipped).

In still another example of the method 500, the computing device may measure one or more winding voltages, "VA", "VB", "VC", and also measure one or more corresponding motor currents "IA", "IB", "IC". The computing device may then transform the currents into expected voltages using a motor model and a known back electromotive force (EMF). If the expected voltages differ by more than a threshold amount from the measured voltages, the computing device may provide an output that is indicative of a motor winding opening circuit (e.g., due to thermal overload).

In some examples, the computing device may provide the output and a log of data from the first sensor and the second sensor to a remote server. For instance, the computing device may report the potential fault and a log of sensor readings leading up to the fault to a remote server for diagnostics, analytics, and support. Additionally or alternatively, the computing device may store the output and a log of data from the first sensor and/or the second sensor in a memory coupled to the robot actuator.

In a further example, the method 500 may also involve automatically identifying relationships between sensors using a machine learning module. As discussed above, multiple sensors of a robot actuator may generate streams of sensor data, and many of the sensor values may be linearly dependent. After monitoring a dataset of the sensor data, the machine learning module may identify that two sensor values are related. For example, the machine learning module may identify that motor temperature, MT, and motor velocity, MV, are related. The machine learning module may then derive a calibration scalar(s) for a normalization function that normalizes the motor velocity for comparison with the motor temperature. In some examples, the machine learning module may also determine a probabilistic distribution of expected values of MT and MV, which may be used to automatically identify outliers in sensor values.

Furthermore, in some examples, the sensor data provided as input to the machine learning module may be received from multiple robot actuators. In some instances, sensor data received from different robot actuators may be grouped according to the type of tasks that particular robot actuators are configured to perform. For instance, sensor data from robot actuators used to perform a first task may be collected into a first group of sensor data, and sensor data from robot actuators used to perform a second task may be collected into a second group of sensor data. This may enable the machine learning module to determine different probabilistic distributions of expected values and error threshold that are specific to particular uses of robot actuators. Thus, the error threshold with which estimates of internal states are compared may vary depending on the particular tasks a robot actuator is performing.

Figure 6:
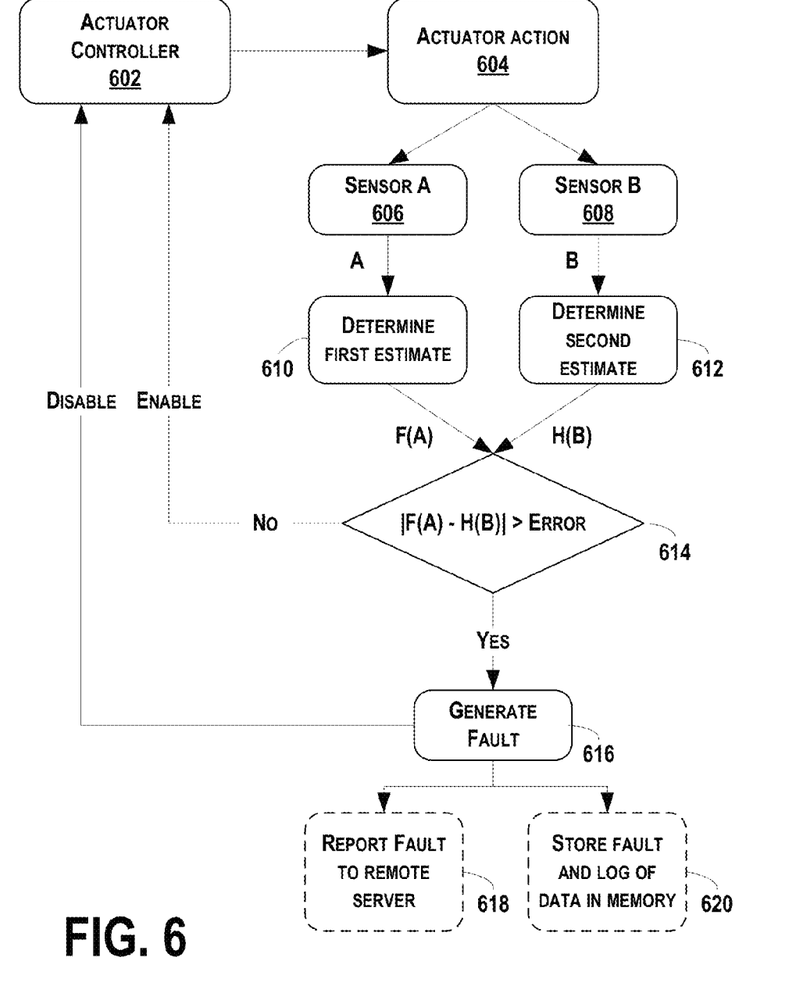
FIG. 6 is a flow chart illustrating an example failure detection method.

FIG. 6 is a flow chart illustrating an example failure detection method. In one example, the failure detection method may be carried out every control cycle. For instance, the failure detection method may be executed every 10 Hz.

As shown in FIG. 6, an actuator controller 602 may cause an actuator action 604. A first sensor 606 may determine a first result "A" of the actuator action, and a second sensor 608 may determine a second result "B" of the actuator action. Subsequently, at block 610, a computing device may determine a first estimate of an internal state, and at block 612, the computing device may determine a second estimate of the internal state. By way of example, a single internal state of the robot actuator may be measured using unique functions F(A) and H(B). At block 614, the computing device may determine whether the first estimate and the second estimate differ by more than an error threshold.

If the first estimate and the second estimate do not differ by more than the error threshold, the computing device may enable the actuator controller to continue controlling the robot actuator. On the other hand, in response to determining that the first estimate differs from the second estimate by more than the error threshold, the computing device may generate a fault at block 616. Optionally, the computing device may also report the fault to a remote server at block 618 and/or store the generated fault and a log of sensor data in a memory coupled to the robot actuator at block 620. As shown in FIG. 6, the computing device may also disable the robot actuator if necessary. For example, if the generated fault is indicative of a broken belt, the computing device may disable the robot actuator. Alternatively, if the generated fault is indicative of a faulty sensor, the computing device may opt to not disable the robot actuator (not shown), but report to the remote server that it is time for maintenance.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
actuating a robot actuator using a computing device;
determining a first result of the actuation using a first sensor of the robot actuator;
determining a second result of the actuation using a second sensor of the robot actuator;
determining a first estimate of an internal state of the robot actuator using the first result of the actuation;
determining a second estimate of the internal state of the robot actuator using the second result of the actuation and a normalization function, wherein the normalization function normalizes the second result of the actuation for comparison with the first estimate of the internal state of the robot actuator;
determining whether a difference between the first estimate of the internal state of the robot actuator and the second estimate of the internal state of the robot actuator satisfies an error threshold; and
in response to determining that the difference does not satisfy the error threshold, providing an output indicative of a potential fault of the robot actuator.

2. The method of claim 1:
wherein determining the first result of the actuation using the first sensor of the robot actuator comprises measuring actuator activity of a first component of the robot actuator, and
wherein determining the second result of the actuation using the second sensor of the robot actuator comprises measuring actuator activity of a second component of the robot actuator.

3. The method of claim 2:
wherein the actuator activity of the first component of the robot actuator comprises a belt tension of a timing belt, and
wherein the actuator activity of the second component of the robot actuator comprises a motor position of a motor.

4. The method of claim 2:
wherein the actuator activity of the first component of the robot actuator comprises a joint position of an actuated joint, and
wherein the actuator activity of the second component of the robot actuator comprises a motor position of a motor.

5. The method of claim 2:
wherein the actuator activity of the first component of the robot actuator comprises a first actuator activity selected from the group consisting of: a belt tension of a timing belt, a motor position of a motor, a joint position of an actuated joint, a torque producing current of a motor driver, a temperature of the motor, a winding voltage of the motor driver, a motor velocity of the motor, and a joint velocity of the actuated joint, and
wherein the actuator activity of the second component of the robot actuator comprises a second actuator activity selected from the group and the second actuator activity is different from the first actuator activity.

6. The method of claim 1:
wherein the first sensor of the robot actuator is configured to sense a first modality, and
wherein the second sensor of the robot actuator is configured to sense a second modality that is different from the first modality.

7. The method of claim 6:
wherein the first modality comprises an angular position, and
wherein the second modality comprises a tension.

8. The method of claim 6:
wherein the first modality comprises a first modality selected from the group consisting of: an angular position, a tension, a velocity, a voltage, a current, and a temperature, and
wherein the second modality comprises a second modality selected from the group and the second modality is different from the first modality.

9. The method of claim 1, wherein the robot actuator comprises a torque controlled actuator.

10. The method of claim 9, wherein the torque controlled actuator comprises:
a frame, and
one or more timing belt stages coupled in serial on the frame, wherein the one or more timing belt stages include an input stage for coupling to a motor and an output stage for coupling to a load, wherein the one or more timing belt stages couple rotation of the motor to rotation of an output of the output stage.

11. The method of claim 1, wherein the internal state of the robot actuator comprises an internal state selected from the group consisting of: a belt tension, an output position, a belt phase, an output torque, a winding temperature, a winding voltage, a winding current, and a motor encoder phase.

12. The method of claim 1, wherein the output is indicative of a potential fault of the first sensor or the second sensor.

13. The method of claim 1, wherein the output is indicative of a potential fault of a component of the robot actuator.

14. The method of claim 1, further comprising providing the output and a log of data from the first sensor and the second sensor to a remote server.

15. The method of claim 1, further comprising storing the output and a log of data from the first sensor and the second sensor in a memory coupled to the robot actuator.

16. The method of claim 1, further comprising:
receiving a log of sensor data acquired using multiple sensors of one or more robot actuators;
identifying a relationship between results of the first sensor and results of the second sensor using a machine learning process and the log of sensor data; and
determining the normalization function based on the identified relationship.

17. A computing device, comprising:
one or more processors; and
a computer-readable medium, configured to store instructions, that when executed by the one or more processors, cause the computing device to perform functions comprising:
receiving a first result of an actuation of a robot actuator from a first sensor of the robot actuator,
receiving a second result of the actuation of the robot actuator from a second sensor of the robot actuator,
determining a first estimate of an internal state of the robot actuator using the first result of the actuation,
determining a second estimate of the internal state of the robot actuator using the second result of the actuation and a normalization function, wherein the normalization function normalizes the second result of the actuation for comparison with the first estimate of the internal state of the robot actuator,
determining whether a difference between the first estimate of the internal state of the robot actuator and the second estimate of the internal state of the robot actuator satisfies an error threshold, and in response to determining that the difference does not satisfy the error threshold, providing an output indicative of a potential fault of the robot actuator.

18. The computing device of claim 17:
wherein the first result of the actuation comprises data indicative of actuator activity of a first component of the robot actuator, and
wherein the second result of the actuation comprises data indicative of actuator activity of a second component of the robot actuator.

19. The computing device of claim 17:
wherein the first sensor of the robot actuator is configured to sense a first modality, and
wherein the second sensor of the robot actuator is configured to sense a second modality that is different from the first modality.

20. A system, comprising:
a robot actuator;
at least two sensors configured to measure actuator activity of the robot actuator; and
a computer-based controller configured to:
receive a first result of an actuation of the robot actuator from a first sensor of the at least two sensors,
receive a second result of the actuation of the robot actuator from a second sensor of the at least two sensors,
determine a first estimate of an internal state of the robot actuator using the first result of the actuation,
determine a second estimate of the internal state of the robot actuator using the second result of the actuation and a normalization function, wherein the normalization function normalizes the second result of the actuation for comparison with the first estimate of the internal state of the robot actuator,
determine whether a difference between the first estimate of the internal state of the robot actuator and the second estimate of the internal state of the robot actuator satisfies an error threshold, and
in response to determining that the difference does not satisfy the error threshold, provide an output indicative of a potential fault of the robot actuator.

21. The system of claim 20:
wherein the first result of the actuation comprises data indicative of actuator activity of a first component of the robot actuator, and
wherein the second result of the actuation comprises data indicative of actuator activity of a second component of the robot actuator.

22. The system of claim 20:
wherein the first sensor of the robot actuator is configured to sense a first modality, and
wherein the second sensor of the robot actuator is configured to sense a second modality that is different from the first modality.

23. The system of claim 20, wherein the robot actuator comprises a torque controlled actuator, the torque controlled actuator comprising:
a frame, and
one or more timing belt stages coupled in serial on the frame, wherein the one or more timing belt stages include an input stage for coupling to a motor and an output stage for coupling to a load, wherein the one or more timing belt stages couple rotation of the motor to rotation of an output of the output stage.

* * * * *